United States Patent
Wen et al.

(10) Patent No.: US 12,211,126 B2
(45) Date of Patent: Jan. 28, 2025

(54) RUN-LENGTH STRIPPING METHOD FOR GENERATING SKELETON LINES OF COMPLEX PLAIN RIVER NETWORKS

(71) Applicant: Zhejiang Institute of Hydraulics & Estuary (Zhejiang Institute of Marine Planning and Design), Hangzhou (CN)

(72) Inventors: Jinhua Wen, Hangzhou (CN); Caijie Yang, Hangzhou (CN); Helong Wang, Hangzhou (CN); Yimin Qian, Hangzhou (CN); Longqiang Su, Hangzhou (CN); Qifeng Li, Hangzhou (CN); Caiming Chen, Hangzhou (CN); Chenkai Cai, Hangzhou (CN)

(73) Assignee: Zhejiang Institute of Hydraulics & Estuary (Zhejiang Institute of Marine Planning and Design), Hangzhou (CN)

( * ) Notice: Subject to any disclaimer, the term of this patent is extended or adjusted under 35 U.S.C. 154(b) by 0 days.

(21) Appl. No.: 18/639,131

(22) Filed: Apr. 18, 2024

(65) Prior Publication Data
US 2024/0355015 A1 Oct. 24, 2024

(30) Foreign Application Priority Data
Apr. 20, 2023 (CN) .......................... 202310423583.8

(51) Int. Cl.
G06T 11/20 (2006.01)
G06T 9/00 (2006.01)

(52) U.S. Cl.
CPC .............. *G06T 11/203* (2013.01); *G06T 9/00* (2013.01)

(58) Field of Classification Search
None
See application file for complete search history.

(56) References Cited

U.S. PATENT DOCUMENTS 5,684,940 A * 11/1997 Freeman ............... G06T 11/206
345/677
2001/0014185 A1 8/2001 Chitradon et al.
(Continued)

FOREIGN PATENT DOCUMENTS

CN 101833780 A 9/2010
CN 102842104 A 12/2012
(Continued)

OTHER PUBLICATIONS

First Office Action for China Application No. 202310423583.8, mailed Feb. 8, 2024.
(Continued)

*Primary Examiner* — Jeffrey J Chow
(74) *Attorney, Agent, or Firm* — Pilloff Passino & Cosenza LLP; Rachel Pilloff; Sean Passino

(57) ABSTRACT

The application relates to a run-length stripping method for generating skeleton lines of complex plain river networks, including following steps: 1. constructing an empty raster field, each raster row generates an empty run-length linked list; 2. completing raster compression on each row, and compressing the continuous grids into run-length units and inserting them into the raster row run-length linked list; 3. establishing a raster field river boundary grid search template; 4. setting two discriminant functions to judge whether a grid on a raster field is a redundant grid; 5. searching all boundary grids along a raster field boundary, and marking and stripping all redundant grids based on two discriminant functions respectively; 6. analyzing whether the boundary grid is stripped, if so, returning to continue stripping, otherwise, entering the next step; 7. converting the non-stripped grid into skeleton line data in vector form.

10 Claims, 21 Drawing Sheets

(56) References Cited

U.S. PATENT DOCUMENTS

| | | | | |
|---|---|---|---|---|
| 2011/0280453 A1* | 11/2011 | Chen | ............... | G01C 21/3807 |
| | | | | 382/113 |
| 2019/0242714 A1* | 8/2019 | Shaked | ............... | G06T 11/206 |
| 2021/0149929 A1* | 5/2021 | Shen | ............... | G06N 20/00 |

FOREIGN PATENT DOCUMENTS

| | | | |
|---|---|---|---|
| CN | 102930561 | A | 2/2013 |
| CN | 105404781 | A | 3/2016 |
| CN | 110675417 | A | 1/2020 |
| CN | 111651885 | A | 9/2020 |
| CN | 111784831 | A | 10/2020 |
| CN | 111797129 | A | 10/2020 |
| WO | 2017149526 | A2 | 9/2017 |
| WO | 2022063005 | A1 | 3/2022 |

OTHER PUBLICATIONS

Zhang Zhiyuan, "Research on automatic Extraction of typical Water Conservancy Elements," Sep. 2019.

Kong Yueping et al., "Skeleton Line Extraction Method for Polygon from Raster Data," Journal of Geomatics Science and Technology, May 2017, vol. 34, No. 3.

Notification to Grant Patent for China Application No. 202310423583.8, mailed Mar. 22, 2024.

First Search Report for China Application No. 202310423583.8, dated Feb. 6, 2024.

Supplementary Search Report for China Application No. 202310423583.8, dated Mar. 18, 2024.

* cited by examiner

RUN-LENGTH STRIPPING METHOD FOR GENERATING SKELETON LINES OF COMPLEX PLAIN RIVER NETWORKS

CROSS-REFERENCE TO RELATED APPLICATIONS

This application claims priority to Chinese Patent Application No. 202310423583.8, filed on Apr. 20, 2023, the contents of which are hereby incorporated by reference.

TECHNICAL FIELD

The application relates to a water conservancy information technology, and in particular to a run-length stripping method for generating skeleton lines of complex river networks.

BACKGROUND

In the field of hydrology and water resources research, river system is the most basic and important research object. Generally speaking, the water system usually refers to a river with a branched structure in which the main stream and several tributaries are interconnected, while the river network refers to a river with a network structure in which many rivers are interconnected in the plain area. The water system and the river network together constitute a river system. As a surface feature, the skeleton line of a river is an abstract description of the shape of the river, usually referring to the curve located in the center of the river, which reflects the main extension direction and shape characteristics of the river. There are many application scenarios for extracting the skeleton line of river system, such as simplifying a double line stream into a single line river in map drawing, and there is also a demand for extracting the skeleton line of river in the field of river detection and identification based on remote sensing images. At the same time, the skeleton line data of river system may provide reference for water resources monitoring, land planning, ship transportation and other industries, which has important application significance.

Common skeleton line extraction methods are mainly divided into vector method and raster method. The vector method mainly includes Delaunay triangulation method and Voronoi diagram method, while the raster method includes classical thinning algorithm and mathematical morphology method. In the vector method, Delaunay triangulation method may get approximate skeleton lines, but when dealing with polygons with parallel contours such as rivers, there will be more "sawtooth" in the obtained skeleton lines; Voronoi diagram method is not disturbed by noise, but the algorithm design is more complicated, and the generated skeleton line needs "pruning". In the raster method, the classical raster thinning algorithm is a special multi-iteration shrinkage algorithm, which gradually removes boundary points or reduces unnecessary points under the condition of maintaining the topological invariance of polygons until the skeleton lines are extracted from the interior of polygons. Mathematical morphology method refines binary images by combining structural elements, which has the advantages of simple algorithm and easy implementation, but the selection of structural elements needs to be designed according to the characteristics of raster data, which may not guarantee the universality. Generally speaking, the vector method has high computational efficiency, and it is easier to seamlessly integrate with the object-oriented map data model, but its program design is more complicated, and it is difficult to avoid some post-processing operations. Compared with the vector method, the raster method may obtain the central axis of the polygon more accurately and avoid generating too many "burrs", but the raster method needs to rasterize the graphics in advance, which reduces the computational efficiency of the algorithm to some extent.

Whether it is raster method or vector method, how to extract the skeleton lines of polygons which have many branches and are long and narrow, has always been a difficult point in research when dealing with road networks and river systems. Especially, the river system has more complex characteristics. Taking the plain river network as an example, the width of large rivers may reach several hundred meters, while the artificial rivers are intertwined, and the narrowest width is even less than 5 meters (m). When using the raster method to extract skeleton lines, the raster resolution must be carefully considered, and the raster should be encrypted as much as possible to improve the accuracy of skeleton line extraction. However, the higher resolution raster means that the algorithm has higher requirements for computer memory use and computational efficiency. Taking a river system in a 100 kilometers (km)× 100 km area as an example, if the raster resolution is set to 0.5 m, the raster data volume will reach 37.25 gigabytes (GB) according to the data volume of one byte stored in each grid, which is a serious burden for personal computers. A more typical case is to extract skeleton lines from the water system of the Yangtze River Basin in China. Since the Yangtze River Basin is 6000 km from east to west and 4000 km from north to south, even if calculated according to the 10-meter resolution raster, its data volume will reach 223 GB.

SUMMARY

The objective of the present application is to overcome the shortcomings of the above background technology and provide a run-length stripping method for generating skeleton lines of complex river networks, which enables complete extraction of skeleton lines of river systems based on run-length encoding data with the characteristics of less memory occupation and high computational efficiency.

The technical scheme provided by the application is as follows:

the application relates to a run-length stripping method for generating skeleton lines of complex river networks, including the following steps:

step 1, constructing an empty raster field based on binary raster data of a river system and setting parameters of the empty raster field; and generating an empty run-length linked list for each of raster rows;

step 2, reading the binary raster data of the river system by rows, and completing raster compression on the rows, compressing continuous grids belonging to a river range into a run-length unit, and inserting the run-length unit into a run-length linked list of the corresponding raster row;

step 3, based on run-length linked list data, in consideration of a complex island structure of river, establishing a raster river boundary grid search template;

step 4, setting two discriminant functions to judge whether a grid on a raster field is a redundant grid, where the redundant grid means connectivity of river raster data being not affected after the grid is stripped (with grid value changed from 1 to 0), and the two discriminant functions are discriminant function 1 and discriminant function 2 respectively;

step 5, for the run-length linked list data, searching all boundary grids along a raster field boundary, marking all strippable redundant grids based on the discriminant function 1, and stripping all the redundant grids at one time after a search is completed;

step 6, for the run-length linked list data, searching all the boundary grids along the raster field boundary, marking all the strippable redundant grids based on the discriminant function 2, and stripping all the redundant grids at one time after the search is completed;

step 7, analyzing whether there are any boundary grids stripped in the step 5 or the step 6; if there are some boundary grids stripped in the step 5 or the step 6, returning to continue the step 5, otherwise, ending a loop and entering to step 8;

step 8, determining retained grids not being stripped as river skeleton line raster data, and converting skeleton line data in a raster form into skeleton line data in a vector form through a grid search.

The binary raster data of the river system in the step 1 is extracted based on remote sensing data or obtained by a rasterization of river vector polygon data;

parameters of the empty raster field are grid range, numbers of raster rows and columns, grid width and height, and each parameter value is consistent with grid parameters of the binary raster data of the river system.

The run-length linked list in the step 1 is used to store the run-length units, and each of the run-length units marks a start column value and an end column value spanned by the run-length unit on the raster row.

For the binary raster data of the river system in the step 2, the "binary" means that the grid value is 0 or 1, where 0 means that the grid is a background grid and 1 means that the grid belongs to a river.

For any raster row, steps of raster compression and run-length unit generation are as follows:

(1) traversing the raster rows one by one from left to right to find the grid value, skipping if being 0, and marking a grid column value with 1 as a start column if 1 is found;

(2) continuing to search grids on the raster rows from left to right, and once the grid column value is not 1, taking a grid column with a value of 1 on a left side of the current grid as an end column; and (3) pairing the start column and the end column to generate a run-length unit, inserting the run-length linked list, and continuing to execute the step (1) until all the grids on the raster rows have been traversed.

In the step 3, the raster field river boundary grid search template is established, and a 2×2 window is used to match the boundary grids, and the 2×2 window represents four grids in the raster field, where one grid is a current search grid and the other three grids are grids to be searched, and by analyzing up, down, left and right directions of a grid boundary search, 24 kinds of river boundary grid search templates are available, where inner boundary grid search templates and outer boundary grid search templates are 12 respectively.

The two discriminant functions in the step 4 are to match a current boundary grid with a 3×3 window; the current boundary grid is located in a middle of the 3×3 window, and judging whether the current grid is strippable or not based on the discriminant functions, meaning whether the grid value is capable of being changed from 1 to 0 without affecting the connectivity of the raster river; numbering 8 adjacent grids clockwise starting from a grid directly above the current boundary grid; for any one of the 8 grids, setting the 0 and 1 transformation values of the grid; when an adjacent grid value is 0 and a next grid value clockwise is 1, the 0 and 1 transformation values of the current grid is considered as 1, otherwise as 0; the 0 and 1 transformation values of all 8 grids are counted in this way.

The discriminant function 1 is:

$$D1 = \sum_{y=1}^{m} \sum_{x=1}^{n} J1(x, y) \quad (5)$$

where m and n are a total number of rows and a total number of columns of the raster field, respectively;

discriminant rules described in the discriminant function 1 is: (1) a boundary grid value is 1, and a sum of 0 and 1 transformation values of the 8 adjacent grids is 1; (2) a sum of 8 adjacent grid values is greater than or equal to 2 and less than or equal to 6; (3) a product of grid values of No. 1 grid, No. 3 grid and No. 5 grid is 0; (4) a product of the grid values of No. 3 grid, No. 5 grid and No. 7 grid is 0;

the discriminant function 2 is:

$$D2 = \sum_{y=1}^{m} \sum_{x=1}^{n} J2(x, y) \quad (6)$$

in this formula, m and n are the total number of rows and the total number of columns of the raster field, respectively;

discriminant rules described in the discriminant function 2 is: (1) a boundary grid value is 1, and a sum of 0 and 1 transformation values of the 8 adjacent grids is 1; (2) a sum of 8 adjacent grid values is greater than or equal to 2 and less than or equal to 6; (3) a product of grid values of No. 1 grid, No. 3 grid and No. 7 grid is 0; (4) a product of the grid values of No. 1 grid, No. 5 grid and No. 7 grid is 0;

a decision of using D1 and D2 is made alternately every time.

For searching all the boundary grids along the raster field boundary in the step 5, specific steps are as follows:

(1) marking left and right sides of all the run-length units in the raster field to mark whether having been searched or not, where the left and right sides of each run-length unit are in a non-searched state in an initial state;

(2) traversing row by row according to the raster row to find the left and right sides of each run-length unit in the raster row, and if a left or right side of a run-length unit has not been searched, taking the grid on the left or right side of the run-length unit as an initial search grid, with a tracking direction upward, and marking the grid as a searched state at the same time;

(3) according to the boundary grid search template provided in the step 3, executing the boundary grid search, finding boundary grids, and marking whether all the boundary grids are required to be stripped according to the discriminant function 1;

(4) after the boundary grid search is completed, performing a stripping operation at one time on all the strippable boundary grids; for the run-length units, a grid stripping is realized by directly modifying column values on the left or right side of the run-length unit;

the step 6 is basically the same as the step 5, and an only difference is: when judging whether the grid is strippable, the discriminant function 2 is used.

The step 7 is to judge whether the step 5 and the step 6 are capable of continuing to stripping the redundant grids; if any redundant grid is not strippable, it means that all remained grids are located on river skeleton lines, and at this time, ending cycle determination operations in the step 5 and the step 6 is necessary.

Generating vector data of the river skeleton lines in the step 8 includes following steps:

(1) dividing grid points reserved in the raster field into three types: end points, connecting points and bifurcation points; marking types of all the grid points; where:
end points suggest that only one of the 8 adjacent grids has the grid value of 1;
the connecting points indicate that only two of the 8 adjacent grids have the grid values of 1, and the two grids are not adjacent; or three of the grid values being 1, and where two grids are in an adjacent relationship;
the bifurcation points mean that three of the 8 adjacent grids have the grid values of 1, and the three grids are not adjacent to each other;

(2) finding all the grids belonging to the end point, recording coordinates of a grid center point, searching the adjacent grids in an order of up, down, left, right, upper left, lower left, lower right and upper right, once an un-searched adjacent grid with a value of 1 is found, marking an original grid as searched, recording coordinates of a new grid center point, and searching the adjacent grids synchronously; circularly executing above steps until another end point grid or bifurcation point grid is searched, and stopping the current search;

(3) after the above steps are completed, all the grids at the end points have completed an order search and generated the skeleton lines, and a small number of the skeleton lines with the bifurcation points at both ends have not completed the search; then, searching all un-searched bifurcation point grids, and performing a grid search in a way of step (2), and recording the coordinates of the grid center point; and (4) automatically connecting all stored skeleton line coordinates into lines, and splicing sub-skeleton lines to generate a whole skeleton line of the river system.

The application has the following beneficial effects.

Aiming at the disadvantages of high memory occupation and low computational efficiency commonly existing in the current automatic extraction method of raster image skeleton lines, the application extracts river system skeleton lines completely based on run-length encoding data. This method attempts to store river data from direct raster encoding to run-length encoding, which may greatly reduce the data volume of grids. Run-length boundary tracking strategy is adopted instead of full raster matrix traversal to realize quick judgment of redundant pixels, which may greatly improve the computational efficiency. The memory consumption of this method is less than 1% of the classical raster encoding method, and the computational efficiency is more than 10 times, so it has the application potential of extracting skeleton lines from TB river raster images on personal computers.

The application has the following characteristics.

First, compared with the conventional direct raster encoding method, the advantages of the present application are particularly obvious. Under direct raster encoding, a matrix is used to store all grid values, especially for the background area not covered by rivers, the invalid value 0 is also stored, so the data volume is huge. However, the application only uses those grids covered by rivers on raster rows, and each run-length unit only stores grid values located at river boundaries, which may greatly reduce the data volume.

Second, for any pixel, the stored value relationship between the pixel and the surrounding eight pixels may not be known, so the existing direct raster encoding method must traverse the whole binary image cyclical and scan the grid one by one according to rows; this method is inefficient, especially for those background pixels with a value of 0, even if the river does not cover the area, it is still inevitable to judge the value of the pixel. However, because the run-length encoding data only stores the grids covered by the river, the application may avoid traversing those background pixels and carrying out redundant pixel discrimination, thereby greatly improving the computational efficiency.

Third, the existing raster thinning method strips pixels from the outside to the inside step by step, and under the direct raster encoding, the pixels that are completely inside during a loop traversal will not be stripped. Therefore, there are a lot of invalid judgments in direct raster encoding data. However, the present application uses run-length encoding data, and all the grid traversal and judgment are located on the river boundary, and the river interior does not participate in the judgment, so that the computational efficiency may be further improved on the basis of the aforementioned second beneficial effect.

DETAILED DESCRIPTION OF THE EMBODIMENTS

In order to realize large-scale, high-precision and high-efficiency automatic extraction of river system skeleton lines on ordinary personal computers, improving the classical raster method is necessary. Considering that river data is stored by full raster encoding when vector is converted into raster, there is a lot of data redundancy in this binary raster image. Therefore, the application proposes to store river data by using run-length encoding, and realize the extraction of river skeleton line based on run-length encoding data, which may be called run-length stripping method. In the direct raster encoding mode, pixel values may be stored one by one according to the column number for any raster row, regardless of whether there is a river crossing in the row. In the run-length encoding mode, only those grids covered by rivers are considered, and only the start column and the end column of river coverage in each raster row need to be marked, which may greatly reduce the data storage capacity, and further realize the high-precision and high-efficiency generation of river skeleton lines.

The technical scheme of the application will be described clearly and completely with the attached drawings.

Figure 1:
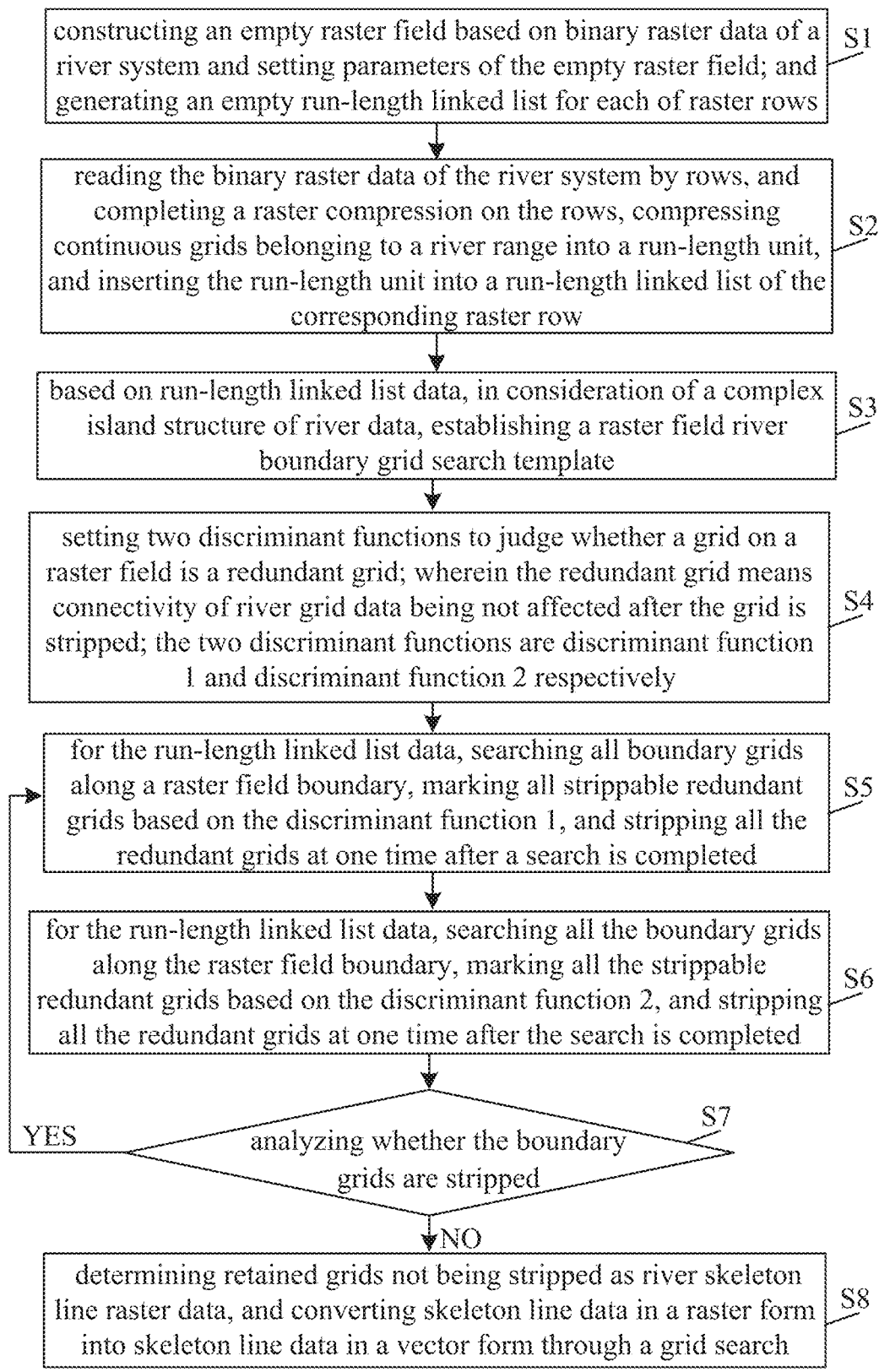
FIG. 1 is a flowchart of an embodiment of the present application.
Figure 2:
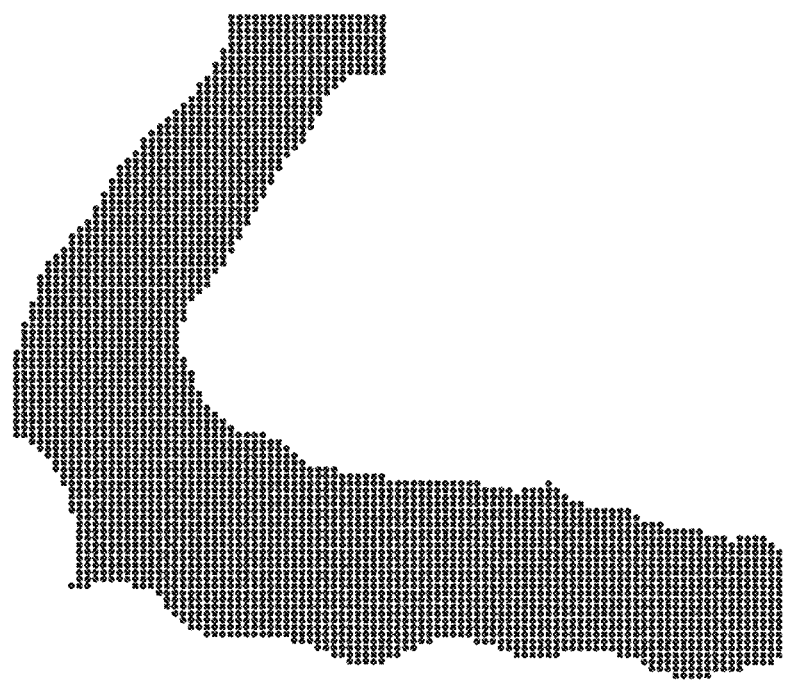
FIG. 2 is an example of binary raster data of a river.
Figure 3A:
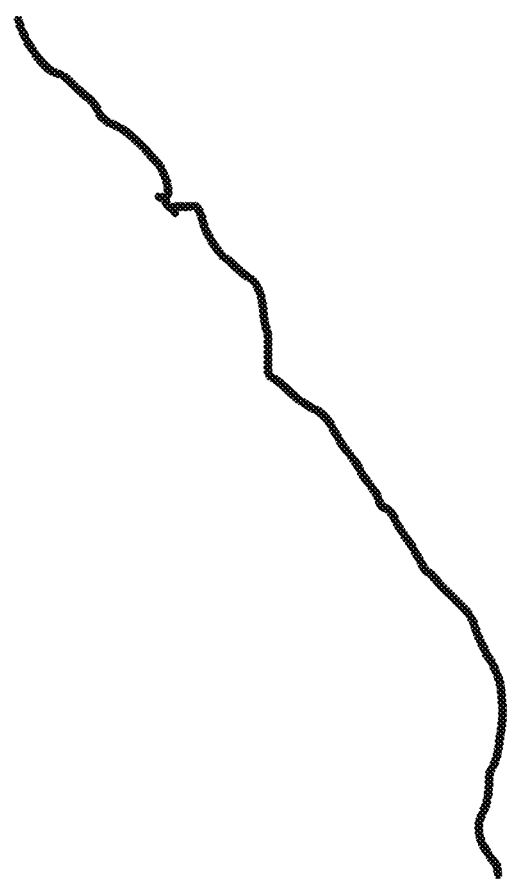
FIG. 3A is the pixel of river skeleton line grid in the embodiments of a river skeleton line grid retained in the raster field after run-length stripping is performed.
Figure 3B:
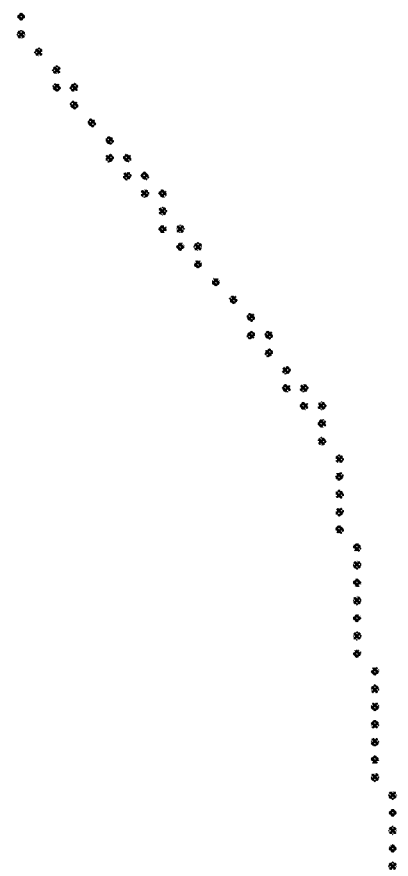
FIG. 3B is the local enlarged picture of the pixel of river skeleton line grid in the embodiments of a river skeleton line grid retained in the raster field after run-length stripping is performed.
Figure 3C:
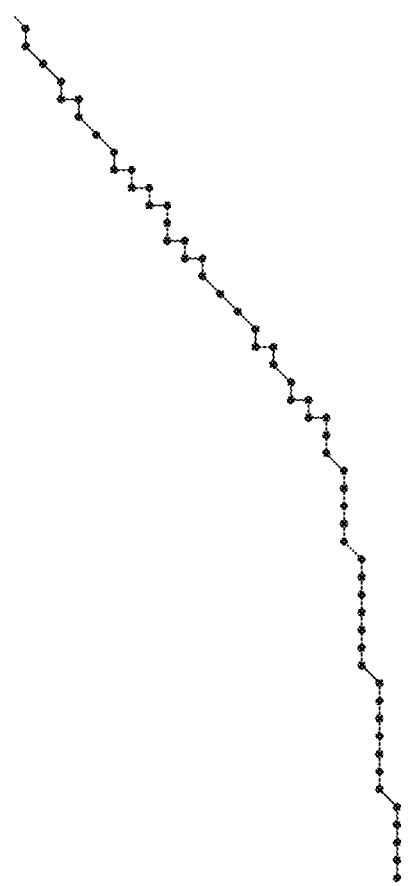
FIG. 3C is the effect picture of superimposed vector skeleton line after tracking the pixel of river skeleton line grid in the embodiments of a river skeleton line grid retained in the raster field after run-length stripping is performed.
Figure 4A:
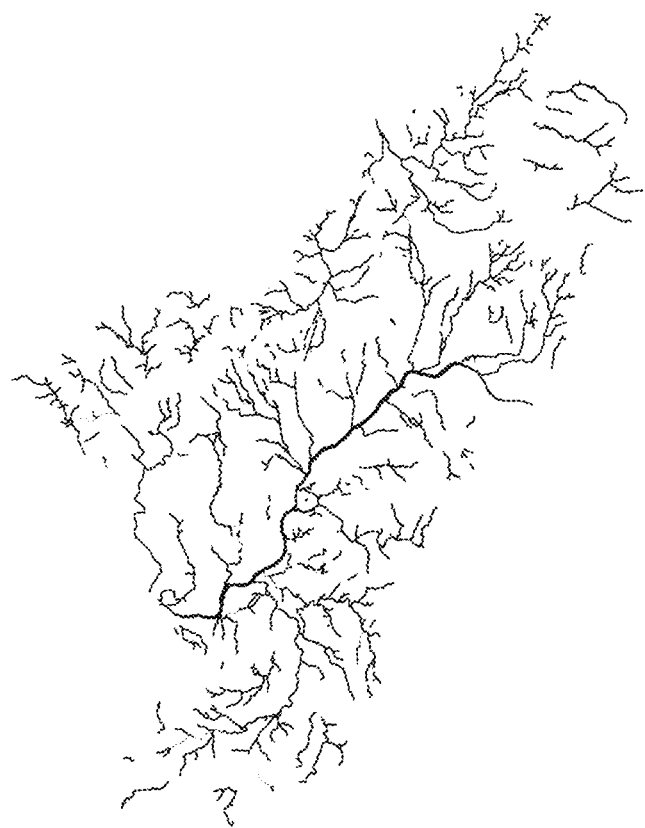
FIG. 4A is a partially enlarged river binary grid diagram of the effect diagrams of skeleton line extraction from binary raster data of a river system in a certain place.
Figure 4B:
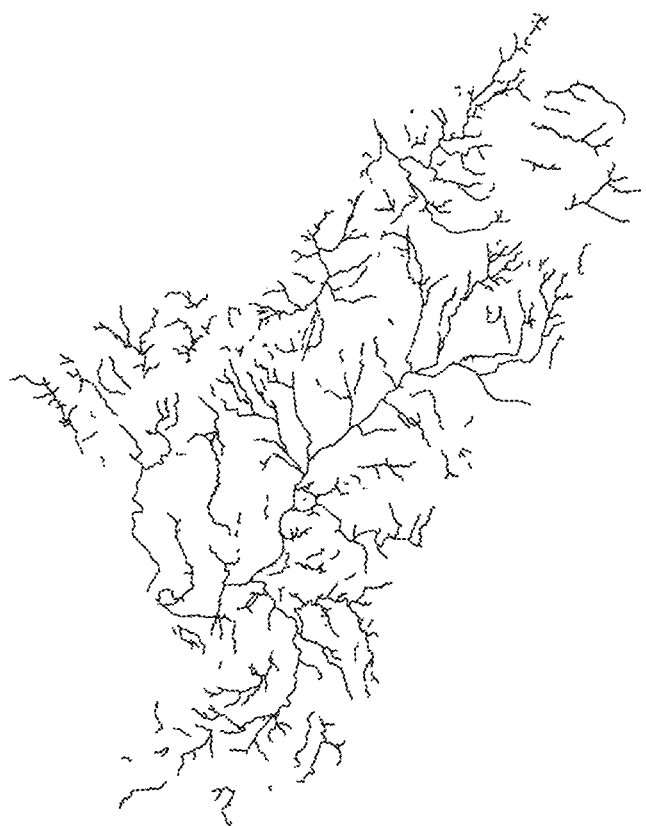
FIG. 4B is a partially enlarged river skeleton line vector data diagram of skeleton line extraction from binary raster data of a river system in a certain place.
Figure 4C:
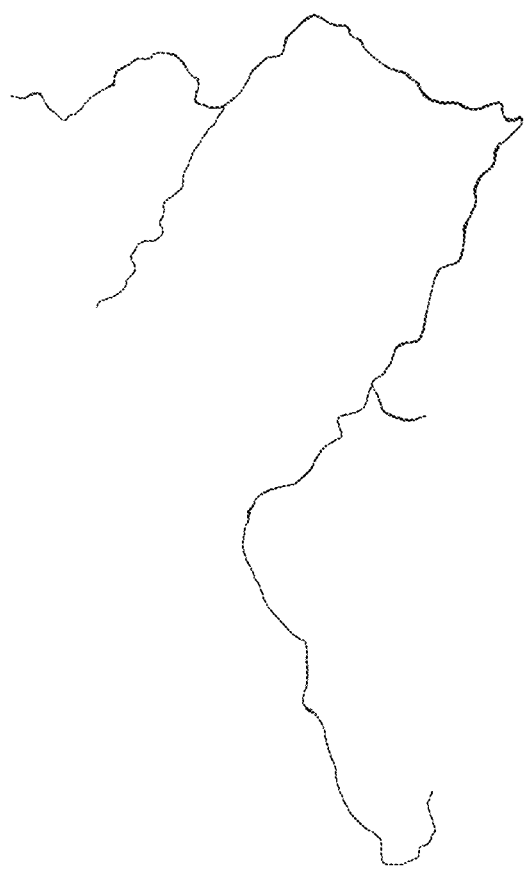
FIG. 4C is a partially enlarged river binary grid diagram of the effect diagrams of skeleton line extraction from binary raster data of a river system in a certain place.
Figure 4D:
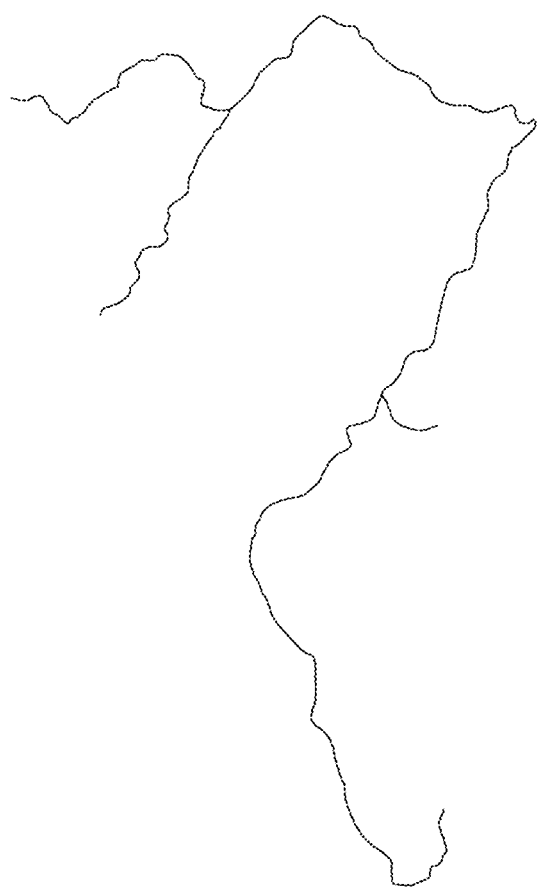
FIG. 4D is a partially enlarged river skeleton line vector data diagram of skeleton line extraction from binary raster data of a river system in a certain place.
Figure 4E:
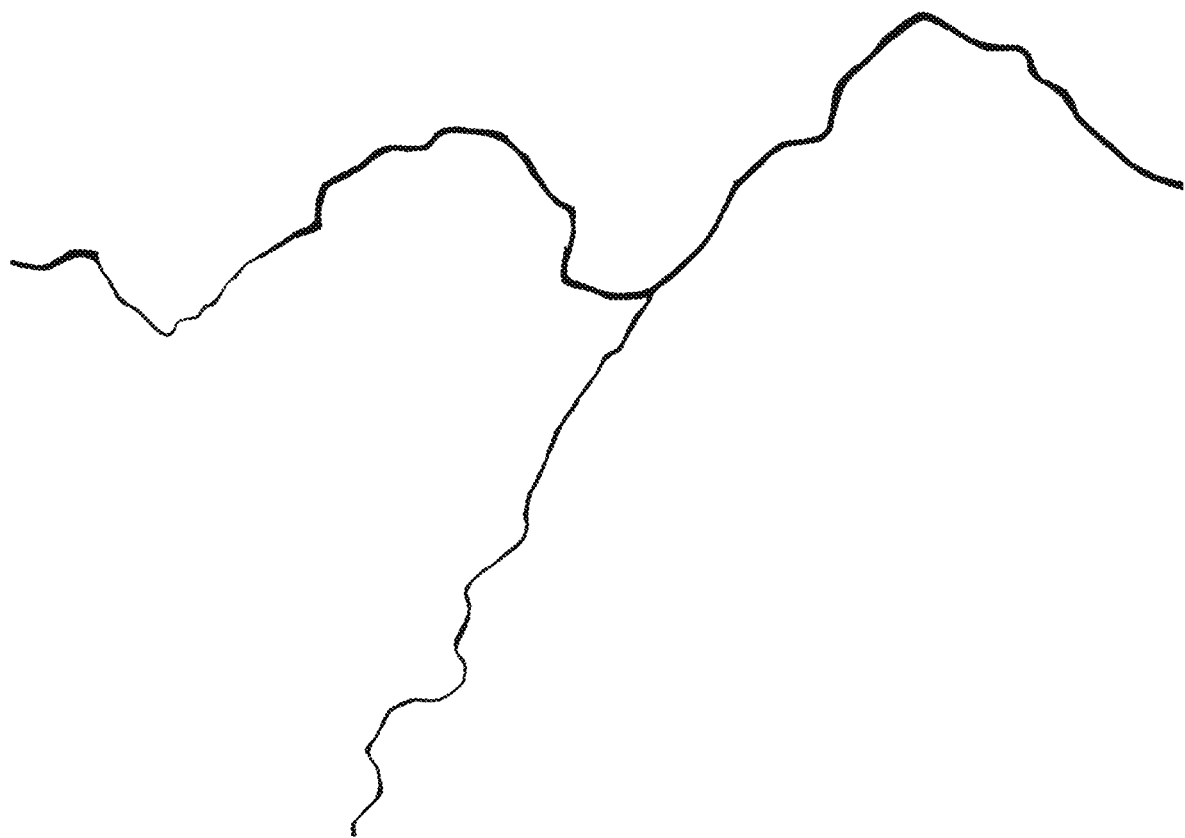
FIG. 4E is a partially enlarged river binary grid diagram of the effect diagrams of skeleton line extraction from binary raster data of a river system in a certain place.
Figure 4F:
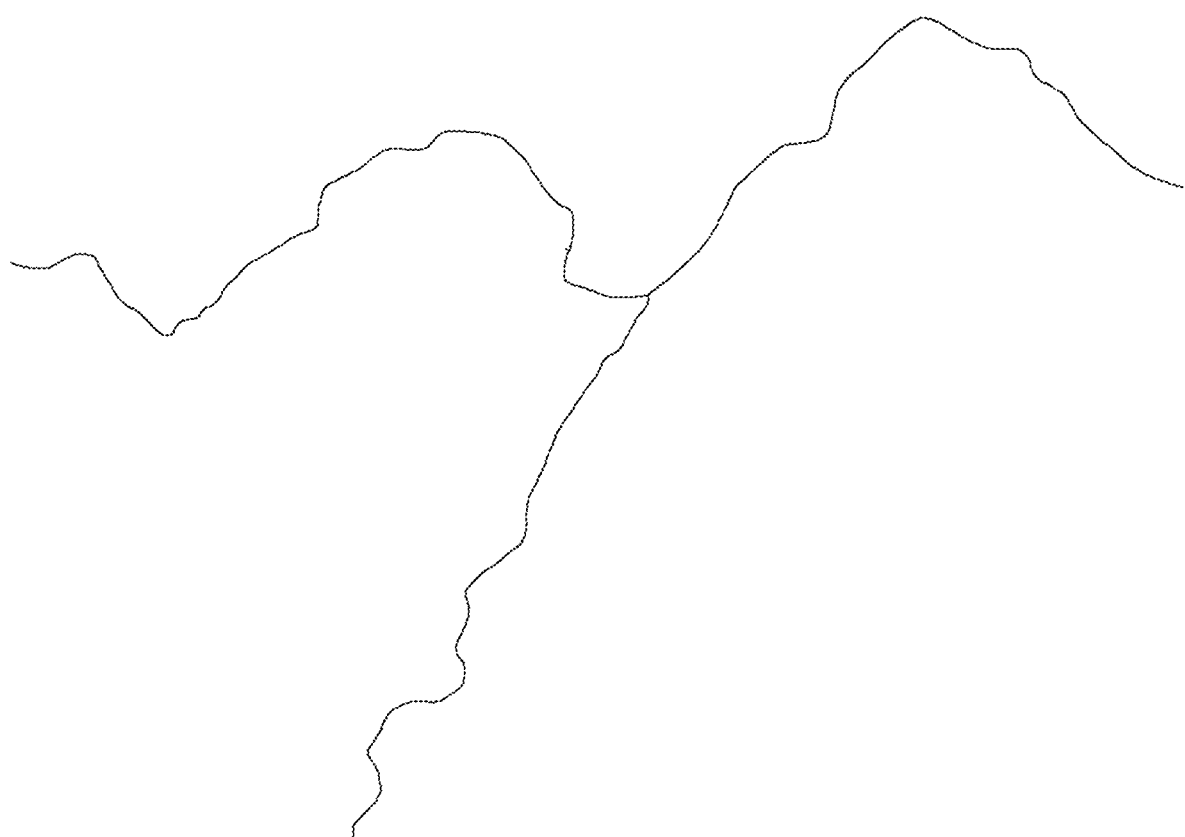
FIG. 4F is a partially enlarged river skeleton line vector data diagram of skeleton line extraction from binary raster data of a river system in a certain place.

FIG. 1 is a flow chart of one embodiment of the present application. FIG. 2 is an example of binary raster data of a river. Any point in the figure represents the coordinates of the center point of the grid in the raster field. Generally speaking, the grid in the raster field may also be called "pixel" or "pixel point". FIG. 3A-FIG. 3C are examples of the grids of river skeleton lines retained in the raster field after run-length stripping. It can be seen that after run-length stripping, only the pixels at the river skeleton lines remain in the raster field, in which the skeleton lines in vector form are superimposed in the FIG. 3C. FIG. 4A-FIG. 4F shows the skeleton line extraction effect of binary raster data of a river system in a certain place (where: FIG. 4B is the extraction effect of FIG. 4A, FIG. 4D is the extraction effect of FIG. 4C, and FIG. 4F is the extraction effect of FIG. 4E), and it can be clearly seen from the partial enlargement that the skeleton line is thinner than the original raster.

The automatic construction method of skeleton lines for river areas in complex plain river networks in the embodiment of the present application shown in FIG. 1 includes the following steps:

step 1 S1, constructing an empty raster field based on binary raster data of river system, and setting parameters such as raster range, numbers of raster rows and columns, grid width and height of the empty raster field; and generating an empty run-length linked list for each raster row.

Here, the empty raster field is actually a set of parameters used to express river raster data by run-length encoding data, which together determine the size of the raster field, and the specific parameters include raster range, numbers of raster rows and columns, grid width and height; the raster range marks the coordinates of the lower left corner (minimum) and the upper right corner (maximum) of the raster field, and the numbers of raster rows and columns determine the grid density of the raster field, while the parameters of grid width and height are determined by the raster field range and the number of raster rows and columns. Generally speaking, the width and height of the grid are the same.

As shown in FIG. 2, in this river binary raster data, the grid value in the range covered by the river is 1, the grid value in the area not covered by the river is 0, and the grid value of 0 exists as a background grid. The raster field represented by run-length encoding is exactly the same as the raster field parameters of current river binary raster data.

The C language forms of the run-length unit and the row run-length linked list are as follows, in which the run-length unit marks the start grid column value and the end grid column value, and the number of run-length units and the memory addresses of the first run-length and the last run-length are stored in the run-length linked list.

| Struct Runlength | Struct RunlengthLIST |
|---|---|
| { | { |
| int StartColNo, EndColNo; | int RunlengthNum; |
| Runlength *Next Runlength; | Runlength *First Runlength; |
| } | } |

Step 2 S2, reading the binary raster data of the river system by rows, and completing a raster compression on the rows, compressing continuous grids belonging to a river range into a run-length unit, and inserting a run-length linked list of the corresponding raster row.

For any raster row, steps of raster compression and run-length unit generation are as follows:

(1) traversing the raster rows one by one from left to right to find the grid value, skipping if being 0, and marking a grid column value with 1 as a start column if 1 is found;

(2) continuing to search grids on the raster rows from left to right, and once the grid column value is not 1, taking a grid column with a value of 1 on a left side of the current grid as an end column; and (3) pairing the start column and the end column to generate a run-length unit, inserting the run-length linked list, and continuing to execute the step (1) until all the grids on the raster rows have been traversed.

Figure 5:
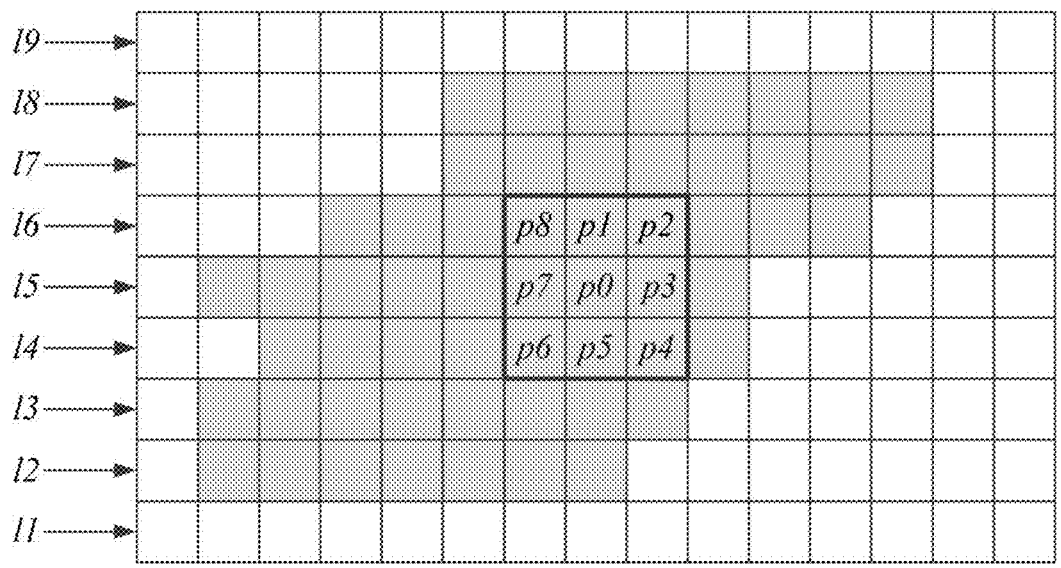
FIG. 5 is a schematic diagram of existing direct raster encoding data and the redundant pixel determination thereof.
Figure 6:
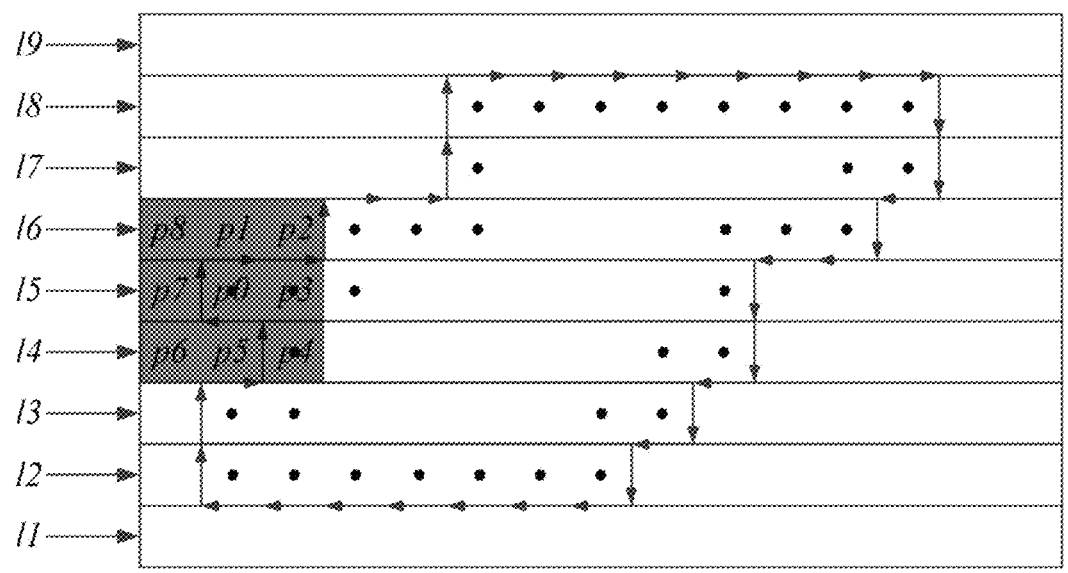
FIG. 6 is a schematic diagram of run-length encoding data and redundant pixel determination thereof according to the present application.

FIG. 5 and FIG. 6 are examples of direct raster encoding and run-length encoding storage, respectively (numbers 11 to 19 in the figure represent the number of raster rows); in FIG. 5, the value of each grid in each raster field is stored, and the existing direct raster encoding stores the grid value in the form of matrix. However, the run-length encoding data in FIG. 6 is a compressed form. It can be seen from the figure that there is only one run-length unit (expressed by a long rectangle) on each raster row, and each run-length unit only needs to store the column values of the first grid covered by the long rectangle and the column values of the last grid. FIG. 5 needs to store 9×15=135 values, while FIG. 6 only needs to store 2×7=14 values. It can be seen that for binary raster data, run-length encoding data has a great compression ratio, which is not the stored pixel value, but the grid column value.

Step 3 S3, based on run-length linked list data, in consideration of a complex island structure of river data, establishing a raster field river boundary grid search template.

Figure 7:
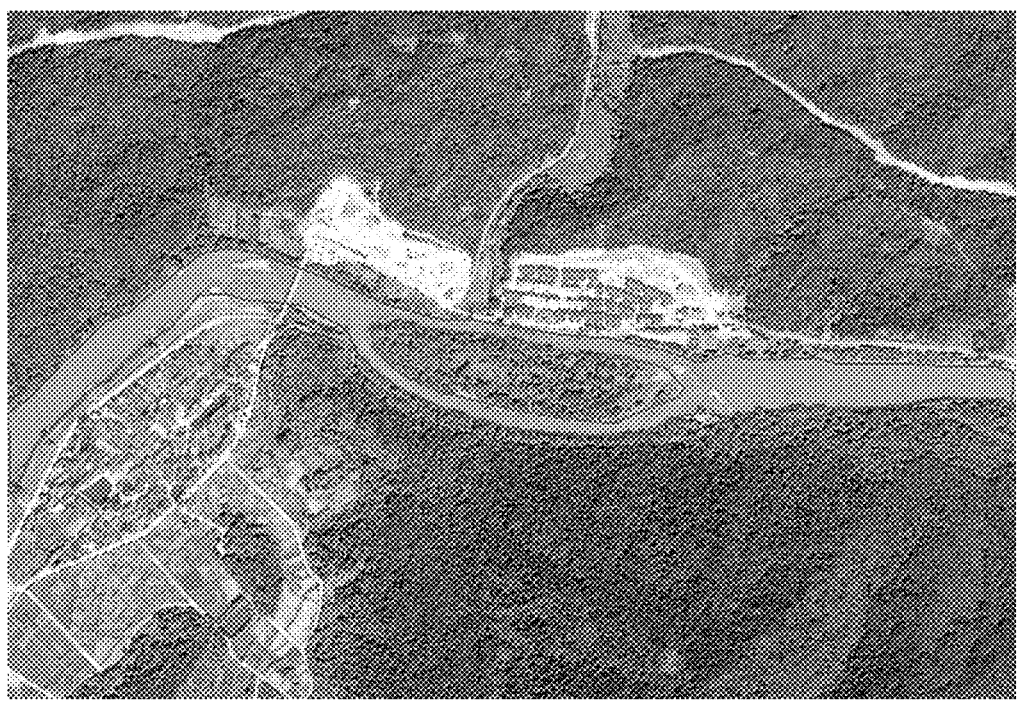
FIG. 7 is a schematic diagram of the outer boundary and the inner boundary of a river.
Figure 8:
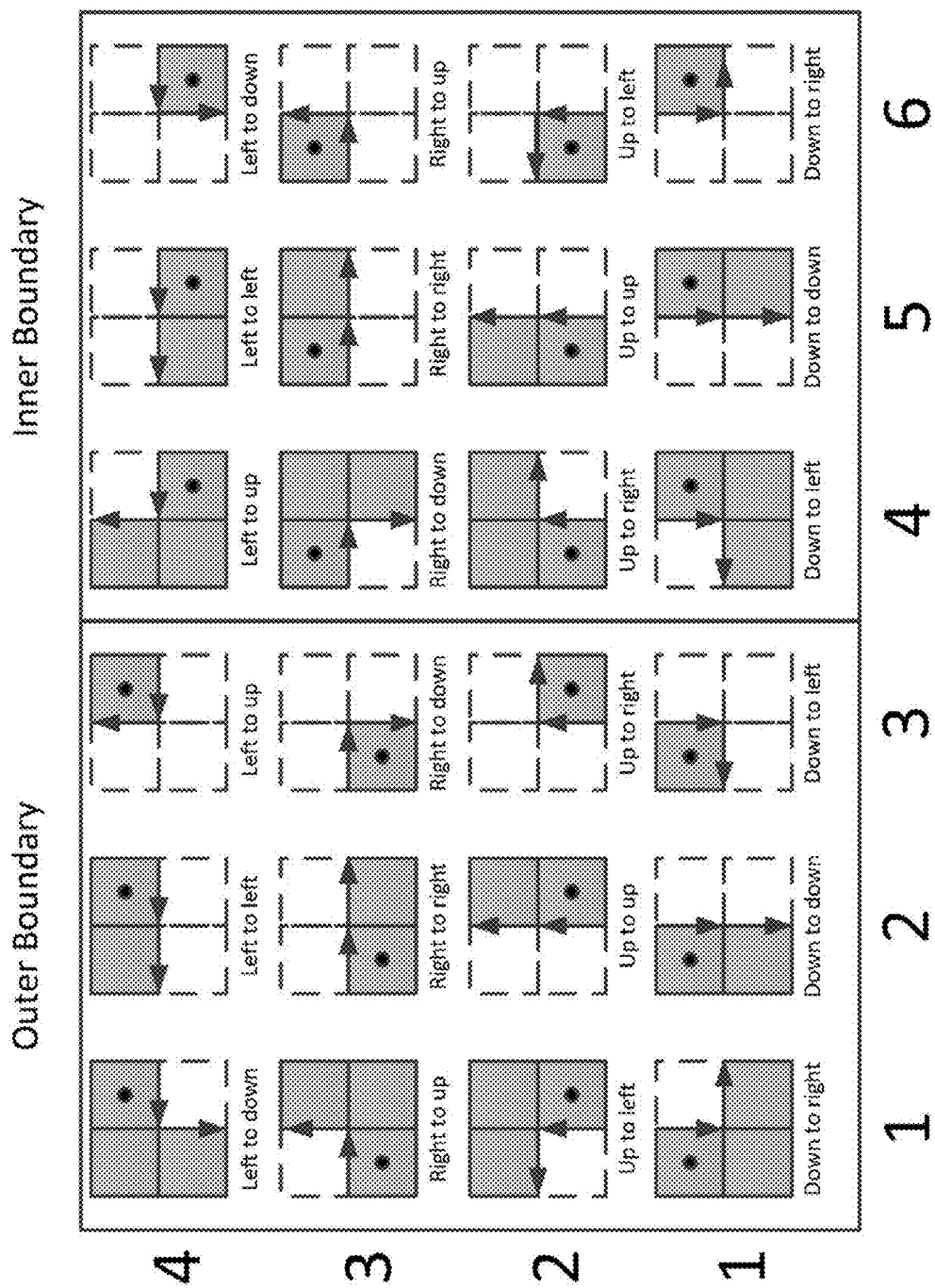
FIG. 8 is a run-length boundary search template according to the present application.

FIG. 7 is a schematic diagram of a river with island structure. The inner and outer boundaries of the river together form a run-length unit sequence. In order to search the inner and outer boundaries of the river completely from the run-length list, a boundary grid search template must be established. Establishing a raster river boundary grid search template (as shown in FIG. 8) is to use a 2×2 window to match the boundary grids. The 2×2 window represents four grids in the raster field, one of which is the current search grid and the other three grids are to be searched. According to the grid value distribution of the four grids, the upward, downward, left and right directions of grid boundary search are analyzed, and there are 24 kinds of river boundary grid search templates, where inner boundary grid search templates and outer boundary grid search templates are 12 respectively.

Figure 9A:
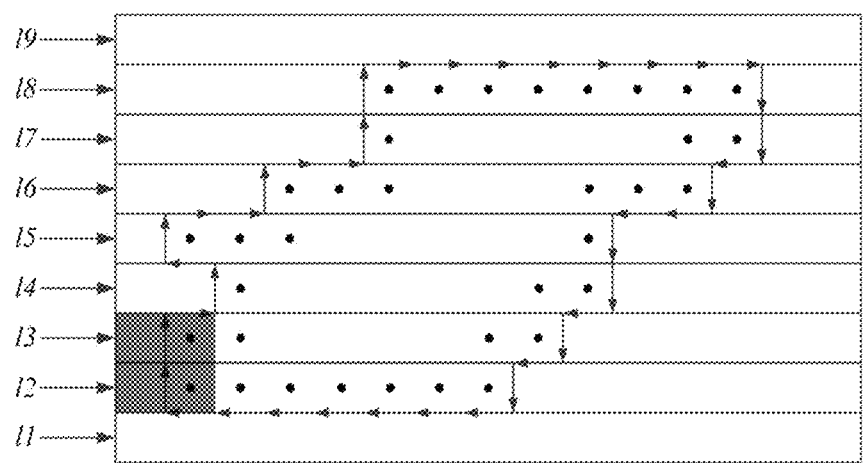
FIG. 9A is a schematic diagram of the run-length boundary search and the redundant pixel stripping according to the present application.
Figure 9B:
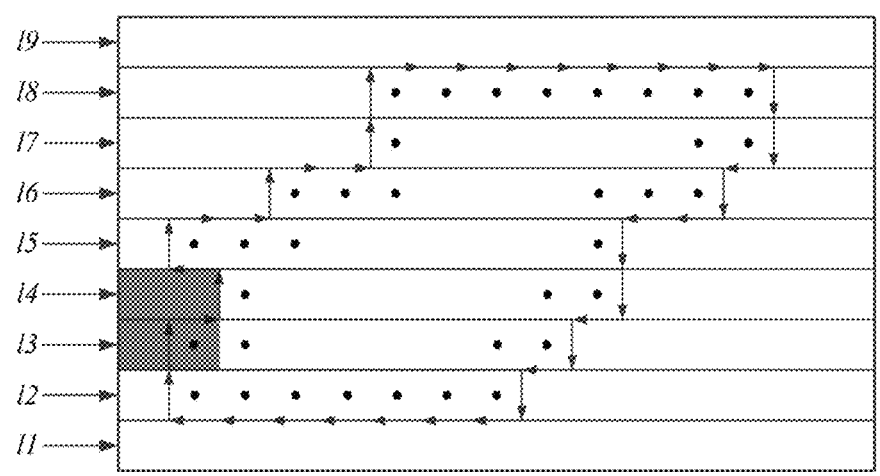
FIG. 9B is a schematic diagram of the run-length boundary search and the redundant pixel stripping according to the present application.

FIG. 9A-FIG. 9B is an example of boundary grid search based on run-length data. As can be seen from the figures, FIG. 9A and FIG. 9B are the "top-up" and "top-to-right" searches of the second line in FIG. 8, respectively, where FIG. 9B is the next step of the search of FIG. 9A, that is, the tracking direction of the grid boundary is from "top-up" and "top-to-right", and this process completes the marking of the boundary grid synchronously.

Step 4 S4, setting two discriminant functions to judge whether a grid on a raster field is a redundant grid; where the redundant grid means connectivity of river raster data being not affected after the grid is stripped (grid value changes from 1 to 0); the two discriminant functions are discriminant function 1 and discriminant function 2 respectively.

FIG. 5 is a schematic diagram of the existing raster thinning method; in the binary image, the target pixel is marked as 1 and the background pixel is marked as 0. p0 is set to be the pixel f (x, y) located in column x and row y on the raster field, p0 is taken as the central pixel, and eight pixel points adjacent to p0 are marked clockwise, and are p1=f (x, y+1), p2=f (x+1, y+1), p3=f (x+1,y), p4=f (x+1,y−1), p5=f (x, y−1), p6=f (x−1,y−1), p7=f (x−1,y), p8=f (x−1,y+1) respectively.

The basic relationship for defining any two adjacent pixels is as follows:

$$\varphi(w) = 1, \text{ if } \begin{cases} pw = 0 \\ p(w+1) = 1 \end{cases} \quad (1)$$

where w is a value from 1 to 8, for example, if w is set to 1, then when p1=0 and p2=1, φ(w)=1, otherwise let φ(w)=0. Especially, when w is 8, because there is no p9, the relationship between p8 and p1 should be compared, that is, when p8=0 and p1=1, φ(w)=1.

The sum of all pairwise adjacent pixel relations of statistical pixel p0 is as follows:

$$\text{Flag}(x, y) = \sum_{w=1}^{8} \varphi(w) \quad (2)$$

As shown in formulas (3) and (4), J1(x, y) and J2(x, y) are two discriminant functions for pixel p0 in column x and row y on the raster field, which are used to judge whether the current grid is redundant. When the qualification conditions are not met, the values of J1(x, y) and J2(x, y) are 0. If p0=1, and satisfies J1(x, y)=1 in Formula (3) or J2(x, y)=1 in Formula (4), then p0 is an erasable point, that is, p0 may be set as a background pixel, which will not affect the connectivity of the raster image.

$$J1(x, y) = 1, \text{ if } \begin{cases} p1+p2+p3+p4+p5+p6+p7+p8 \geq 2 \\ p1+p2+p3+p4+p5+p6+p7+p8 \leq 6 \\ p1*p3*p5 = 0 \\ p3*p5*p7 = 0 \\ \text{Flag}(x, y) = 1 \end{cases} \quad (3)$$

$$J2(x, y) = 1, \text{ if } \begin{cases} p1+p2+p3+p4+p5+p6+p7+p8 \geq 2 \\ p1+p2+p3+p4+p5+p6+p7+p8 \leq 6 \\ p1*p3*p7 = 0 \\ p1*p5*p7 = 0 \\ \text{Flag}(x, y) = 1 \end{cases} \quad (4)$$

Step 5 S5, for the run-length linked list data, searching all boundary grids along a raster field boundary, marking all strippable redundant grids on the left and right sides of all run-length units based on the discriminant function 1, and stripping all the strippable boundary grids at one time after a search is completed.

According to formula (3), all pixels in the raster field are traversed, and pixels satisfying=1 are deleted at one time. The pixel connectivity detection in the raster field is shown in Formula (5):

$$D1 = \sum_{y=1}^{m} \sum_{x=1}^{n} J1(x, y) \quad (5)$$

where m and n are the total numbers of rows and columns of the raster field respectively, and D1 is the number of pixels to be deleted after traversing the raster field once. According to the above description, the pseudo code of the first boundary search and deleting redundant pixels is as follows:

---
If p1+p2+p3+p4+p5+p6+p7+p8≥2 and p1+p2+p3+p4+p5+p6+p7+p8≤6;
  Int Flag=0;
If p1==0 and p2==1 Then Flag++;
If p2==0 and p3==1 Then Flag++;
If p3==0 and p4==1 Then Flag++;
If p4==0 and p5==1 Then Flag++;
If p5==0 and p6==1 Then Flag++;
If p6==0 and p7==1 Then Flag++;
If p7==0 and p8==1 Then Flag++;
If p8==0 and p1==1 Then Flag++;
If Flag==1 and p1*p3*p5==0 and p3*p5*p7==0 Then p0 can removed
---

Step 6 S6, for the run-length linked list data, searching all the boundary grids along the raster field boundary, marking all the strippable redundant grids on the left and right sides of all run-length units based on the discriminant function 2, and stripping all the strippable boundary grids at one time after the search is completed;

According to formula (4), all pixels in the raster field are traversed, and the pixels satisfying J2(x, y)=1 are deleted at one time. The pixel connectivity detection in the raster field is shown in (6):

$$D2 = \sum_{y=1}^{m}\sum_{x=1}^{n} J2(x, y) \qquad (6)$$

where m and n are the total number of rows and columns of the raster field respectively, and D2 is the number of pixels to be deleted after traversing the raster field once. According to the above description, combined with formulas (1)-(6), the pseudo code of the grid thinning core algorithm is as follows:

---
If p1+p2+p3+p4+p5+p6+p7+p8≥2 and p1+p2+p3+p4+p5+p6+p7+p8≤6;
  Int Flag=0;
If p1==0 and p2==1 Then Flag++;
If p2==0 and p3==1 Then Flag++;
If p3==0 and p4==1 Then Flag++;
If p4==0 and p5==1 Then Flag++;
If p5==0 and p6==1 Then Flag++;
If p6==0 and p7==1 Then Flag++;
If p7==0 and p8==1 Then Flag++;
If p8==0 and p1==1 Then Flag++;
If Flag==1 and p1*p3*p7==0 and p1*p5*p7==0 Then p0 can removed
---

Step 7 S7, analyzing whether the boundary grids are stripped in the step 5 and the step 6; if yes, returning to continue the step 5, otherwise, ending a loop and entering to a step 8.

In the step 5 and the step 6, the discrimination of D1 and D2 is carried out alternately every time; for example, D1 is executed first to delete all the pixels that are capable of being deleted, then D2 is executed, and all the pixels that are capable of being deleted are also deleted, and D1 is executed again, and so on until there are no pixels that are capable of being deleted in the raster field. Therefore, the step 5 and the step 6 appear in pairs. Once the step 5 is executed, the step 6 will be executed in sequence, and the loop will continue.

Step 8 S8, determining retained grids not being stripped as river skeleton line raster data, and converting skeleton line data in a raster form into skeleton line data in a vector form through a grid search.

Figure 10:
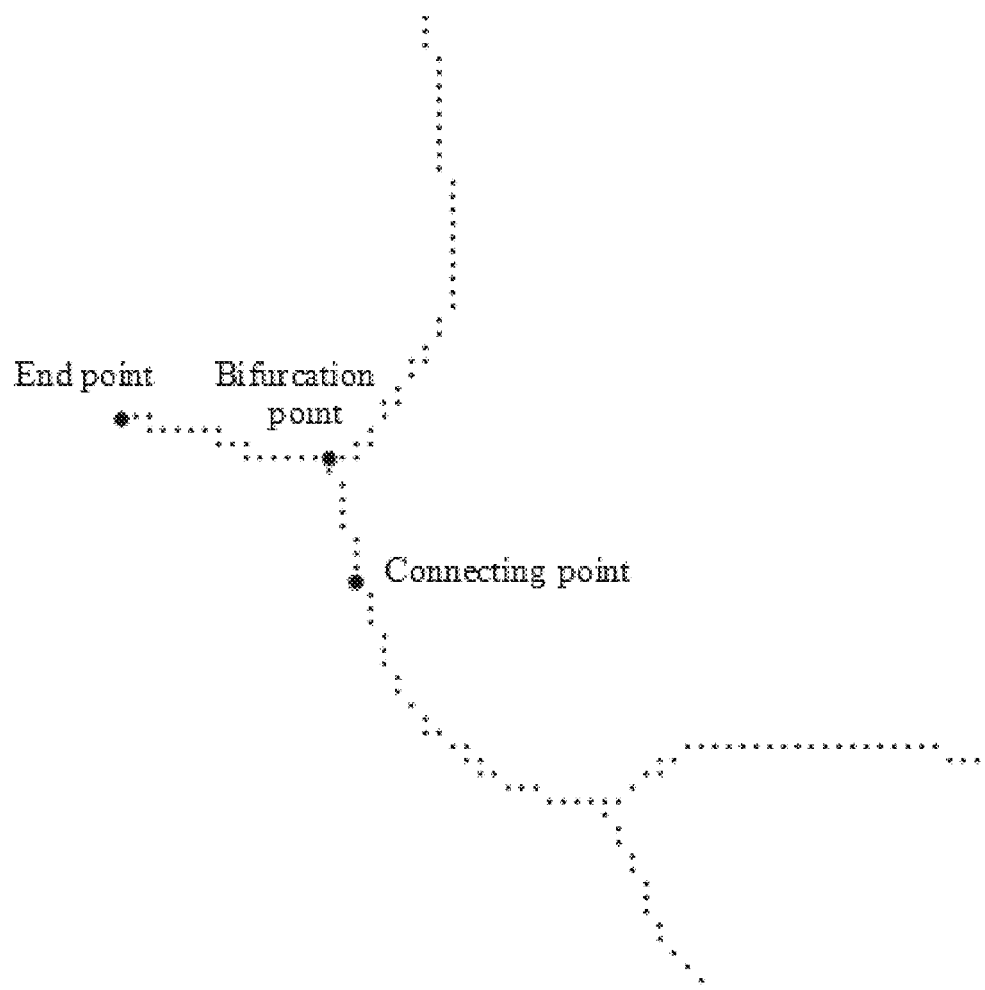
FIG. 10 is a schematic diagram of marking the end points, connecting points and bifurcation points of the river skeleton line grid tracking according to the present application.

As shown in FIG. 10, after the two sides of the run-length unit are stripped step by step, the pixels represented by the run-length unit will have the same effect as shown in the figure. A large number of run-length units have only one pixel, that is, the start column value and the end column value of the run are the same. Some run-length units also retain multiple pixel points, such as the run-length of the line where the bifurcation point is located. It is necessary to design a grid conversion vector strategy in this run-length data to generate skeleton line data in a vector form.

Therefore, the grid pixel points where the skeleton lines are located are divided into three categories, namely, end points, connecting points and bifurcation points. The end points mean that only one of the 8 adjacent grids has the grid value of 1, as shown in FIG. 11A; connecting points indicate that only two of the 8 adjacent grids have the grid values of 1, and the two grids are not adjacent; or three of the grid values being 1, and where two grids are in an adjacent relationship, as shown in FIG. 11B; the bifurcation points mean that three of the 8 adjacent grids have the grid values of 1, and the three grids are not adjacent to each other, and all grid types are marked, as shown in FIG. 11C.

Figure 11A:
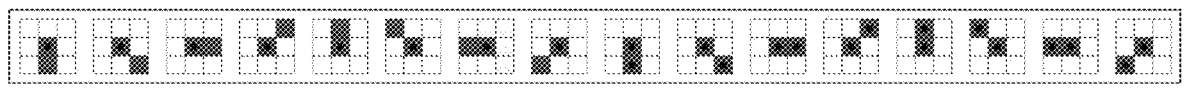
FIG. 11A is an end point tracking direction template.
Figure 11B:
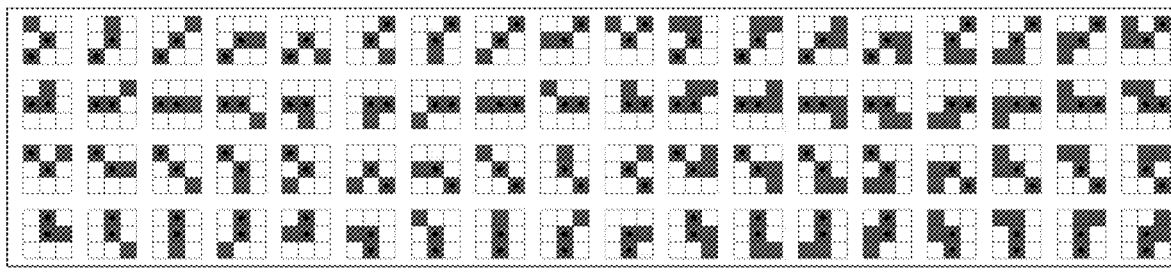
FIG. 11B is a connecting point tracking direction template.
Figure 11C:
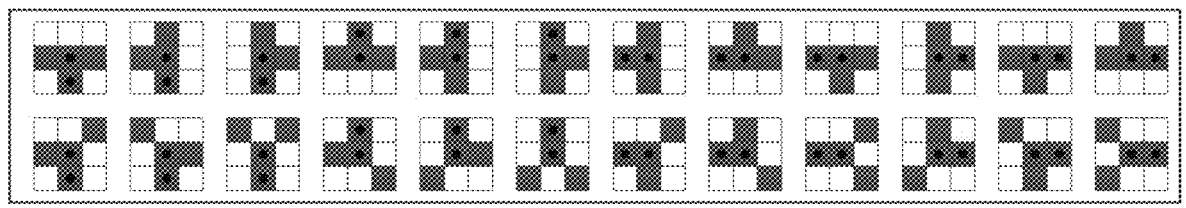
FIG. 11C is a bifurcation point tracking direction template.

FIG. 11A-FIG. 11C are tracking direction templates of end point, connecting point and bifurcation point, in which the grid in the middle of the nine squares represents the pixel point of the current tracing grid, and the grid with the center of the grid as a painted point among the 8 adjacent grids means that the grid has been traced and cannot be traced again in the future.

The skeleton line grid pixel tracking strategy of the present application is as follows: firstly, tracking is started from all end points, as shown in FIG. 11A, because only adjacent grid pixels have values at end points, if the grid pixel has not been tracked, it will be directly tracked to the grid pixel, and if the grid has been tracked, it will be directly withdrawn from this tracking, and all tracked pixels will be connected in sequence to generate skeleton line vector point data. Similarly, if a bifurcation point as shown in FIG. 11C is found in the tracking process, the tracking is also directly withdrawn, and all the tracked pixel points are sequentially connected to generate skeleton line vector point data.

After tracing from all end points, there are still a few skeleton lines in the raster field that are not traced, and the two end points of these skeleton lines are bifurcation points. As shown in FIG. 10, this is the case with a skeleton line below the location of the marked bifurcation point. Therefore, after tracing from all the end points, it is necessary to search the raster field again, find those untracked bifurcation points, and trace all the grid cells with bifurcation points at both ends of the skeleton line. Finally, all the tracked skeleton lines are spliced to generate complete vector line data of river skeleton lines.

What is claimed is:
1. A run-length stripping method for generating skeleton lines of complex river networks, comprising following steps:
step 1, constructing an empty raster field based on binary raster data of a river system and setting parameters of the empty raster field; and generating an empty run-length linked list for each of raster rows;
step 2, reading the binary raster data of the river system by rows, and completing a raster compression on the rows, compressing continuous grids belonging to a river range into run-length units, and inserting the run-length units into a run-length linked list of a corresponding raster row;
step 3, based on run-length linked list data, in consideration of a complex island structure of river data, establishing a raster field river boundary grid search template;
step 4, setting two discriminant functions to judge whether a grid on a raster field is a redundant grid: wherein the redundant grid means connectivity of river grid data being not affected after the grid is stripped: the two discriminant functions are discriminant function 1 and discriminant function 2 respectively;
step 5, for the run-length linked list data, searching all boundary grids along a raster field boundary, marking all strippable redundant grids based on the discriminant function 1, and stripping all the redundant grids at one time after a search is completed;
step 6, for the run-length linked list data, searching all the boundary grids along the grid field boundary, marking all the strippable redundant grids based on the discriminant function 2, and stripping all the redundant grids at one time after the search is completed;
step 7, analyzing whether the boundary grids are stripped in the step 5 and the step 6: if so, returning to continue the step 5, otherwise, ending a loop and entering to a step 8;
step 8, considering retained grids not being stripped as river skeleton line grid data, and converting skeleton line data in a raster form into skeleton line data in a vector form through a grid search;

wherein the two discriminant functions in the step 4 are shown in formulas (3) and (4), the two discriminant functions are J1(x, y) and J2(x, y) for pixel p0 in column x and row y on the raster field, and the two discriminant functions are used to judge whether a current grid is redundant; when qualification conditions are not met, values of J1(x, y) and J2(x, y) are 0; if p0=1, and satisfies J1(x, y)=1 in Formula (3) or J2(x, y)=1 in Formula (4), then p0 is an erasable point, p0 is set as a background pixel, connectivity of a raster image is not be affected;

$$J1(x, y) = 1, \text{ if } \begin{cases} p1 + p2 + p3 + p4 + p5 + p6 + p7 + p8 \geq 2 \\ p1 + p2 + p3 + p4 + p5 + p6 + p7 + p8 \leq 6 \\ p1 * p3 * p5 = 0 \\ p3 * p5 * p7 = 0 \\ \text{Flag}(x, y) = 1 \end{cases} \quad (3)$$

$$J2(x, y) = 1, \text{ if } \begin{cases} p1 + p2 + p3 + p4 + p5 + p6 + p7 + p8 \geq 2 \\ p1 + p2 + p3 + p4 + p5 + p6 + p7 + p8 \leq 6 \\ p1 * p3 * p7 = 0 \\ p1 * p5 * p7 = 0 \\ \text{Flag}(x, y) = 1 \end{cases} \quad (4)$$

wherein p1 to p8 are 8 grids that start from a grid directly above a current boundary grid and number adjacent grids in a clockwise direction.

2. The run-length stripping method for generating the skeleton lines of the complex river networks according to claim 1, wherein the binary raster data of the river system in the step 1 is extracted based on remote sensing data or obtained by a rasterization of river vector polygon data:

parameters of the empty raster field are raster range, numbers of raster rows and columns, grid width and height, and each parameter value is consistent with raster parameters of the binary raster data of the river system.

3. The run-length stripping method for generating the skeleton lines of the complex river networks according to claim 2, wherein the run-length linked list in the step 1 is used to store the run-length units, and each of the run-length units marks a start column row value and an end column value spanned by the run-length unit on the corresponding raster row.

4. The run-length stripping method for generating the skeleton lines of the complex river networks according to claim 3, wherein for the binary raster data of the river system in the step 2, "binary" means that the grid value is 0 or 1, 0 means that the grid is a background grid and 1 means that the grid belongs to a river:

for any raster row, steps of raster compression and run-length unit generation are as follows:
(1) traversing the raster rows one by one from left to right to find the grid value, skipping if being 0, and marking a grid column value with 1 as a start column if 1 is found;
(2) continuing to search grids on the raster rows from left to right, and once the grid column value is not 1, taking a grid column with a value of 1 on a left side of the current grid as an end column; and
(3) pairing the start column and the end column to generate a run-length unit, inserting the run-length linked list, and continuing to execute the step (1) until all the grids on the raster rows have been traversed.

5. The run-length stripping method for generating the skeleton lines of the complex river networks according to claim 4, wherein in the step 3, the raster field river boundary grid search template is established, and a 2×2 window is used to match the boundary grids, and the 2×2 window represents four grids in the grid field, wherein one grid is a current search grid and other three grids are grids to be searched, and according to grid value distribution of the four grids, by analyzing up, down, left and right directions of a grid boundary search, 24 kinds of river boundary grid search templates are available, wherein inner boundary grid search templates and outer boundary grid search templates are 12 respectively.

6. The run-length stripping method for generating the skeleton lines of the complex river networks according to claim 5, wherein the two discriminant functions in the step 4 are to match a current boundary grid with a 3×3 window, the current boundary grid is located in a middle of the 3×3 window, and judging whether the current grid is strippable or not based on the discriminant functions, meaning whether the grid value is capable of being changed from 1 to 0 without affecting connectivity of a river raster: numbering 8 adjacent grids clockwise starting from a grid directly above the current boundary grid: for any one of the 8 grids, setting the 0 and 1 transformation values of the grid; when an adjacent grid value is 0 and a next grid value clockwise is 1, the 0 and 1 transformation values of the current grid is considered as 1, otherwise as 0; the 0 and 1 transformation values of all 8 grids are counted in this way.

7. The run-length stripping method for generating the skeleton lines of the complex river networks according to claim 6, wherein the discriminant function 1 is:

$$D1 = \sum_{y=1}^{m} \sum_{x=1}^{n} J1(x, y) \quad (5)$$

wherein m and n are a total number of rows and a total number of columns of the raster field, respectively;
discriminant rules described in the discriminant function 1 is: (1) a boundary grid value is 1, and a sum of 0 and 1 transformation values of the 8 adjacent grids is 1: (2) a sum of 8 adjacent grid values is greater than or equal to 2 and less than or equal to 6: (3) a product of grid values of No. 1 grid, No. 3 grid and No. 5 grid is 0: (4) a product of the grid values of No. 3 grid, No. 5 grid and No. 7 grid is 0;

the discriminant function 2 is:

$$D2 = \sum_{y=1}^{m} \sum_{x=1}^{n} J2(x, y) \quad (6)$$

wherein m and n are the total number of rows and the total number of columns of the grid field, respectively;
discriminant rules described in the discriminant function 2 is: (1) a boundary grid value is 1, and a sum of 0 and 1 transformation values of the 8 adjacent grids is 1: (2) a sum of 8 adjacent grid values is greater than or equal to 2 and less than or equal to 6: (3) a product of grid values of No. 1 grid, No. 3 grid and No. 7 grid is 0; (4) a product of the grid values of No. 1 grid, No. 5 grid and No. 7 grid is 0;
a decision of using D1 and D2 is made alternately every time.

8. The run-length stripping method for generating the skeleton lines of the complex river networks according to claim 7, wherein for searching all the boundary grids along the grid field boundary in the step 5, specific steps are as follows:
- (1) marking left and right sides of all the run-length units in the raster field to mark whether having been searched or not, where the left and right sides of each run-length unit are in a non-searched state in an initial state;
- (2) traversing row by row according to the raster row to find the left and right sides of each run-length unit in the raster row, and if a left or right side of a run-length unit has not been searched, taking a grid on the left or right side of the run-length unit as an initial search grid, with a tracking direction upward, and marking the grid as a searched state at the same time;
- (3) according to the boundary search template provided in the step 3, executing the grid boundary search, finding searched boundary grid, and marking whether all the boundary grids are required to be stripped according to the discriminant function 1;
- (4) after the boundary grid search is completed, performing a stripping operation at one time on all strippable boundary grids: for the run-length units, a grid stripping is realized by directly modifying column values on the left or right side of the run-length unit;

the step 6 is basically same as the step 5, and an only difference is: when judging whether the grid is strippable, the discriminant function 2 is used.

9. The run-length stripping method for generating the skeleton lines of the complex river networks according to claim 8, wherein the step 7 is to judge whether the step 5 and the step 6 are capable of continuing to stripping the redundant grids: if any redundant grid is not strippable, all remained grids are determined to be located on river skeleton lines, and at this time, ending cycle determination operations in the step 5 and the step 6 is necessary.

10. The run-length stripping method for generating the skeleton lines of the complex river networks according to claim 9, wherein generating vector data of the river skeleton lines in the step 8 comprises following steps:
- (1) dividing grid points reserved in the raster field into three types: end points, connecting points and bifurcation points: marking types of all the grid points: wherein:

the end points represent only one of the 8 adjacent grids has the grid value of 1;

the connecting points represent only two of the 8 adjacent grids have the grid values of 1, and the two grids are not adjacent: or three of the grid values being 1, and wherein two grids are in an adjacent relationship;

the bifurcation points represent three of the 8 adjacent grids have the grid values of 1, and the three grids are not adjacent to each other;
- (2) finding all the grids belonging to the end point, recording coordinates of a grid center point, searching the adjacent grids in an order of up, down, left, right, upper left, lower left, lower right and upper right, once an un-searched adjacent grid with a value of 1 is found, marking an original grid as searched, recording coordinates of a new grid center point, and searching the adjacent grids synchronously: circularly executing above steps until another end point grid or bifurcation point grid is searched, and stopping the current search;
- (3) after the above steps are completed, all the grids at the end points have completed an order search and generated the skeleton lines, and a small number of the skeleton lines with the bifurcation points at both ends have not completed the search; then, searching all un-searched bifurcation point grids, and performing a grid search in a way of step (2), and recording the coordinates of the grid center point; and
- (4) automatically connecting all stored skeleton line coordinates into lines, and splicing sub-skeleton lines to generate a whole skeleton line of the river system.

* * * * *